United States Patent
Olsvik et al.

(10) Patent No.: US 6,838,071 B1
(45) Date of Patent: Jan. 4, 2005

(54) PROCESS FOR PREPARING A $H_2$-RICH GAS AND A $CO_2$-RICH GAS AT HIGH PRESSURE

(75) Inventors: Ola Olsvik, Hundhammeren (NO); Roger Hansen, Trondheim (NO); Arne Grislingås, Trondheim (NO); Erling Rytter, Trondheim (NO)

(73) Assignee: Den Norske Stats Oljeselskap A.S., Stavanger (NO)

(*) Notice: Subject to any disclaimer, the term of this patent is extended or adjusted under 35 U.S.C. 154(b) by 0 days.

(21) Appl. No.: 09/787,316
(22) PCT Filed: Sep. 14, 1999
(86) PCT No.: PCT/NO99/00280
§ 371 (c)(1), (2), (4) Date: Mar. 16, 2001
(87) PCT Pub. No.: WO00/18680
PCT Pub. Date: Apr. 6, 2000

(30) Foreign Application Priority Data
Sep. 16, 1998 (NO) .............................. 984295

(51) Int. Cl.[7] .............................. C01B 3/24; C01B 3/26
(52) U.S. Cl. .................. 423/437.2; 423/650; 423/652; 429/17
(58) Field of Search .................. 423/437.2, 650, 423/651, 652, 653, 654

(56) References Cited

U.S. PATENT DOCUMENTS

| | | | |
|---|---|---|---|
| 3,652,454 A | * | 3/1972 | Robin et al. ............. 252/373 |
| 3,699,218 A | * | 10/1972 | Smith et al. ............. 423/652 |
| 4,681,745 A | | 7/1987 | Pinto |
| 4,699,772 A | | 10/1987 | de Lathouder |
| 4,963,339 A | * | 10/1990 | Krishnamurthy et al. ... 423/650 |
| 5,073,356 A | * | 12/1991 | Guro et al. ............. 423/652 |
| 5,152,975 A | * | 10/1992 | Fong et al. ............. 423/652 |
| 5,714,132 A | | 2/1998 | Kapoor et al. |
| 6,048,472 A | * | 4/2000 | Nataraj et al. ............. 423/652 |
| 6,083,425 A | * | 7/2000 | Clawson et al. ............. 423/652 |
| 6,153,163 A | * | 11/2000 | Prasad et al. ............. 423/651 |
| 6,207,122 B1 | * | 3/2001 | Clawson et al. ............. 423/654 |
| 6,214,066 B1 | * | 4/2001 | Nataraj et al. ............. 423/651 |

FOREIGN PATENT DOCUMENTS

| | | |
|---|---|---|
| CA | 868821 | 4/1971 |
| EP | 0289419 | 11/1988 |

* cited by examiner

Primary Examiner—Wayne A. Langel
(74) Attorney, Agent, or Firm—Wenderoth, Lind & Ponack, L.L.P.

(57) ABSTRACT

The present invention comprises a method for production of a $CO_2$-rich gas stream and a $H_2$-rich gas stream, the method comprising the following steps: a) natural gas and water are fed to a reforming reactor and are converted to synthesis gas under supply of a $O_2$-containing gas: b) the gas stream from a) is shifted, whereby the content of CO is reduced and the amounts of $CO_2$ and $H_2$ are increased by reaction of $H_2O$; c) the gas stream from b) is separated in a separation unit into a $CO_2$-rich and a $H_2$-rich gas stream, respectively. The invention also concerns the use of a $CO_2$-rich gas stream for injection into marine formations, and the use of a $H_2$-rich gas stream for hydrogenation, as a source of energy/fuel in fuel cells or for production of electricity.

16 Claims, 2 Drawing Sheets shows POX or ATR with oxygen

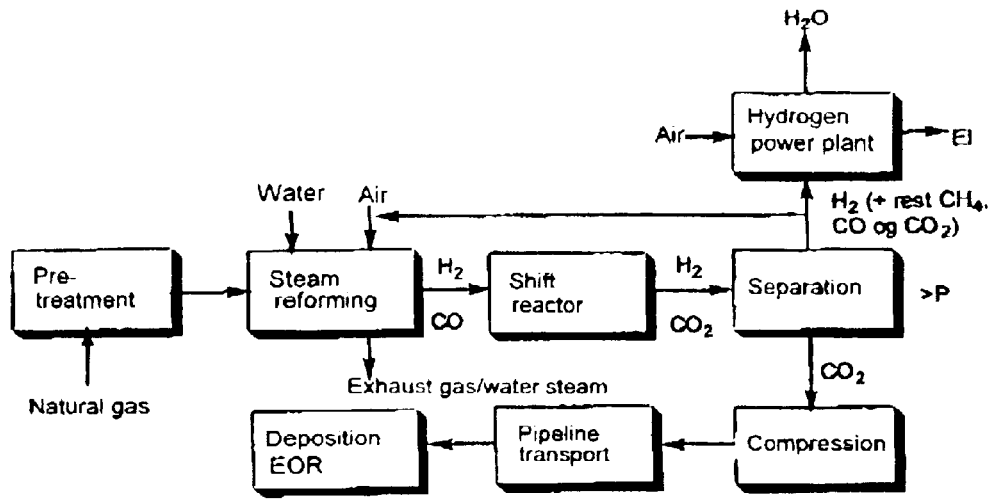
Figure 1 shows known technique in the form of steam reforming with hydrogen firing
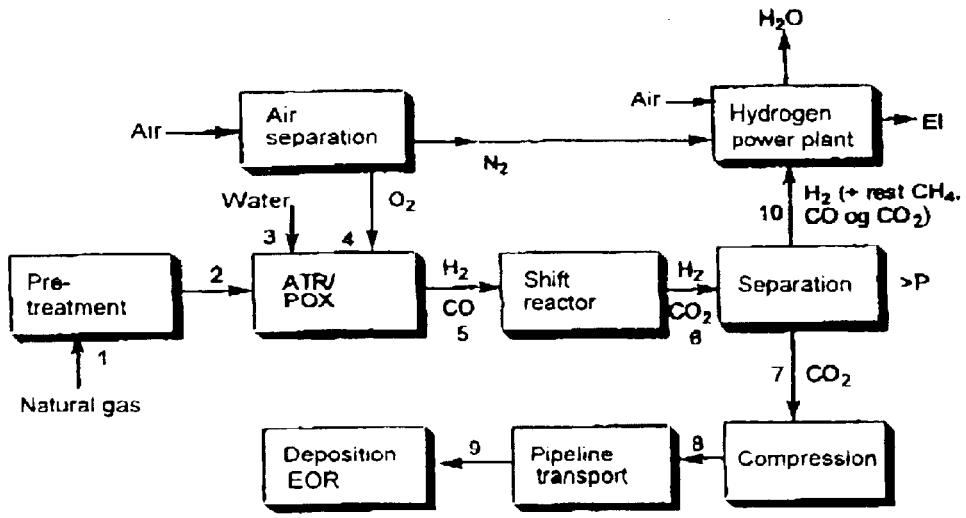
Figure 2 shows POX or ATR with oxygen

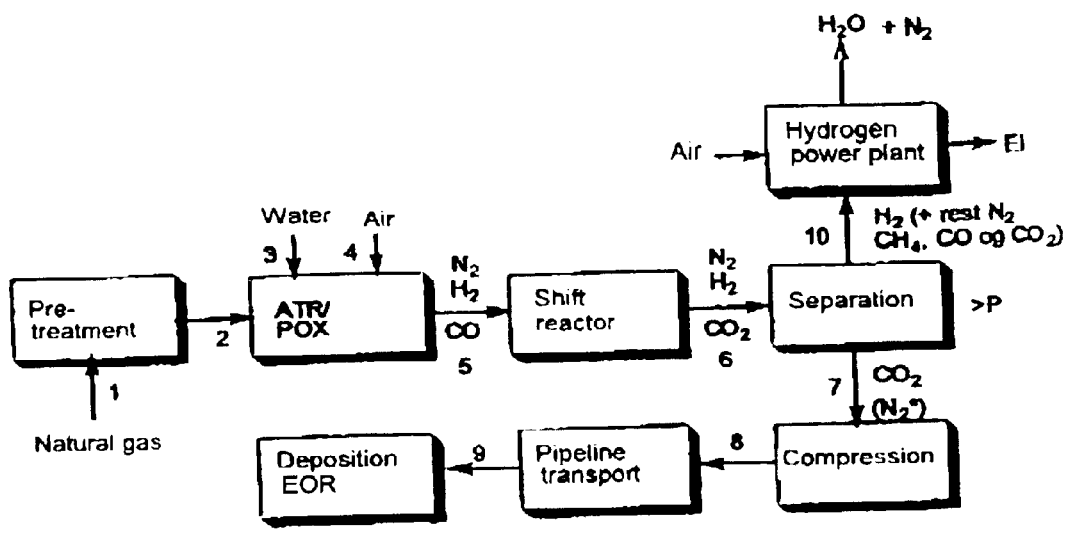
Figure 3 shows POX or ATR with air
($N_2^*$): By use of one or more membrane units $N_2$ is run together with $CO_2$.

PROCESS FOR PREPARING A $H_2$-RICH GAS AND A $CO_2$-RICH GAS AT HIGH PRESSURE

This application is a 371 application of PCT/NO99/00280 filed Sep. 14, 1999.

The present invention comprises a method for production of a $CO_2$-rich gas for injection purposes or to be deposited, and a hydrogen-rich gas, as well as use thereof.

It is commonly assumed that the greenhouse effect and the climate on earth are closely connected to human made emissions of $CO_2$. These emissions are primarily formed by combustion of coal and hydrocarbons, i.a. by generation of heat and electric power. A desireable goal is therefore to reduce the emission of $CO_2$ to the atmosphere.

It is known art to reduce the emission of $CO_2$ from combustion of natural gas, e.g. by gas reforming and shift technology for preparation of a mixture consisting of hydrogen and carbon dioxide. These components are then separated, whereafter hydrogen is used as fuel in a gas turbine and carbon dioxide is deposited after compression to desired pressure. The deposition can be made on the bottom of the sea or in geological reservoires. The reservoires can also contain hydrocarbons. The above mentioned technique is i.a. described in Teknisk Ukeblad No. 16, page 8, 1998.

Known art comprising gas reforming and shift technology as described above is very expensive while providing less energy yield than a conventional, modern gas power plant.

U.S. Pat. No. 3,652,454 describes preparation of $CO_2$ and $H_2$ from a gas stream containing CO by an improved continuous catalytical shift reaction at high pressure. The reaction takes place i one or more shift reactors at a superatmospheric pressure of from 35 to 250 atmospheres, and a temperature between 287° C. and 537° C. The patent does not describe reforming of natural gas.

From EP 0 000 993-A1 it is known a method for preparation of ammonia by means of a primary and a secondary catalytic reforming of an hydrocarbon stream at superatmospheric pressure. From the primary catalytic reforming the ratio of steam to carbon is from 2.5 to 3.5, the pressure is from 30 to 120 bar and the temperature out of the reactor is from 750 to 850° C. From the secondary catalytic reforming the content of methane is from 0.2 to 10% by weight on a dry basis and the ratio of hydrogen to nitrogen is from 2.2 to 2.7. To the he secondary reforming there is added an excess of air for preparing a gas with a higher content of methane, i.e. at a lower temperature, and/or a lower steam ratio and/or a higher pressure. In the above mentioned EP patent $CO_2$ is removed moved at a low pressure by taking out hydrogen at an elevated pressure for further use by the preparation of ammonia.

EP 0 289 419 describes catalytic steam reforming of hydrocarbons for preparing hydrogen i an ammonia process. The catalytic steam reforming takes place at a pressure from 25 to 120 bar, a temperature from 800 to 1000° C. and at at ratio steam:carbon of 1.8–2.5. The process is operated in such a way that there are less than 0.3% impurities in the $H_2$-rich gas which is to be used for production of ammonia. The present invention allows a higher content than 0.3% of CO, $CO_2$ and $CH_4$ in the $H_2$-rich gas stream.

CA 868,821 describes the preparation of synthesis gas by steam reforming of hydrocarbons in a gas and a liquid at 50–250 absolute atmospheres, preferably 160 abs. atm. for production of ammonia and methanol.

Known art does not deal with a simplified plant as comprised by the present invention, where natural gas is reformed at high pressure in an autothermal reformer followed by a shift reactor, whereafter a $CO_2$-rich gas is provided at a pressure in the interval from 1 to 100 bar, which leads to reduced compression costs by deposition and reinjection. The simplified plant results in that a limited part of the carbon in the raw material is in the form of methane or carbon monoxide when the hydrogen-rich gas mixture is fed as a fuel to a gas power plant. A result of the reduced demand to the purity of the product gas involves that one or more of the process steps can be operated at a higher pressure, a lower temperature and/or a lower ratio steam/carbon.

The present invention comprises a method for production of a $CO_2$-rich gas stream and a $H_2$-rich gas stream, whereby the method is characterized by the following steps:

a) natural gas and water are fed to a reforming reactor and are converted to synthesis gas under supply of a $O_2$-containing gas;

b) the gas stream from a) is shifted, whereby the content of CO is reduced and the amounts of $CO_2$ and $H_2$ are increased by reaction of $H_2O$;

c) the gas stream from b) is separated in a separation unit into a $CO_2$-rich and a $H_2$-rich gas-stream, respectively.

It is a further object of the present invention that the shift process in b) is carried out in one step where the ratio $H_2O$:CO in the shift process can be from 1 to 9, preferably 1.5 to 4. In the present invention the pressure i the $CO_2$-rich gas stream after the separation unit is from 1 to 100 bar, preferably front 5 to 50 bar. The carbon part in the $H_2$-rich gas stream is from 1 to 20 % by volume, preferably from 5 to 15 % by volum. The invention is characterized in that to the natural gas in step a) it is added an oxygen rich gas or air/oxygen enriched air stream. The reforming reactor according to the invention is preferably a partial oxidation reaktor, especially an autothermal reformer. The gas stream from a combustion chamber in an autothermal reformer is brought in contact with a catalyst bed. When the reforming takes place in en partial oxidation reaktor, the reaction is carried out without a catalyst. Further, the gas stream out of the reformer has a temperature within the interval from 800 to 1200° C. When the natural gas i step a) is supplied with air/oxygen enriched air at least a part of $N_2$ follows the $CO_2$-rich gas stream through the process. The present invention also concerns the use of the $CO_2$-rich gas stream prepared according to the previously mentioned method, where the $CO_2$-rich gas stream is injected into marine formations. Further, the invention comprises the use of the $H_2$-rich gas stream prepared according to the invention, where the $H_2$-rich gas stream can be utilized for hydrogenation, in the production of electricity and as a source of energy/fuel in fuel cells.

An important feature of the invention is that the $CO_2$-rich stream is present at an elevated pressure, which means that the compression work which is necessary to bring the pressure up to the injection pressure or deposition pressure (50–250 bar) becomes as little as possible. This requires a high pressure through all units (reformer, shift unit and separator unit). As an example the natural gas which is fed into the reformer can have a pressure of 30–200 bar. By a marginal pressure drop in the reformer and the shift unit, the pressure into the separation unit will be within the same interval.

The present invention provides several advantages when producing a $H_2$-rich and a $CO_2$-rich gas, respectively. One of the advantages is that increased pressure gives increased reaction for each volume unit in reformer and shift reactor, and further a reduced compression work of $CO_2$ by a possible reinjection or deposition. In addition, increased pressure gives reduced compression work fox feed to the gas turbine. In the reformer there is high primary formation of $CO_2$ as a result of high pressure. Another advantage of the present invention is a simplified design and operation of a possible a gas turbine for combustion of the $H_2$-rich gas stream as a result of a certain slip of $CH_4$ in the reformer, CO in the shift reactor and $CO_2$ in the separation step. The use of air or oxygen enriched air in the case of an autothermal reformer (ATR) and partial oxdation (POX) give savings in oxygen units and gives a simplified design and operation of ATR and gas turbine. A certain CO slip, i.e. not reacted gas component, makes low temperature shift and methanation unnecessary. In the present invention it might be necessary to supply steam to the shift reactor. A certain slip of $CO_2$ in the present invention simplifies the separation process. If the separation is carried out with amine washing, a moderate pressure release might be sufficient.

The present invention comprises a number of embodiments where i.a. natural gas is cleaned and pre-treated in a suitable manner so that the gas feed mainly will consist of methane after treatment. The reforming takes place at a pressure within the interval 30 to 200 bar. It is preferred to use a shift reactor when carrying out the present invention. Steam can be supplied to the shift reactor, but it can also be operated without supply of steam. At the outlet of the shift reactor a content on carbon basis of CO up to 2 % by volume, preferably 5% by volume, and methane with 2% by volume, preferably 5% by volume, is acceptable. Further, the $H_2$-rich gas stream according to the invention can contain at least 1% by volume and up to maximum 20% by volume of the original amount of carbon in the natural gas. The steam reformer can be fired with the hydrogen rich fuel gas. If autothermal reforming is used at least a part of the hydrogen rich stream can be used for pre-heating of the feed gas. Pre-heating of the feed gas can also be carried out by heat exchange with warm gas from a gas turbine.

The object of the present invention is that a limited part of the carbon in the feed stream/raw material is in the form of methane, carbon monoxide or carbon dioxide when the hydrogen rich gas mixture is fed as fuel to a gas power plant. In the present invention reforming of natural gas, shift of carbon monoxide to carbon dioxide and separation of the gas mixture into $CO_2$-rich and $H_2$-rich gas, respectively, takes place at conditions which have not been described in known technique. The mentioned conditions are also ofside of those which is accepted and recommended in the petrochemical industry.

Because the method is characterized by a reduced requirement to methane and carbon monoxide in the feed stream/raw material which i.a. is passed to a gas power plant, this will involve that one or more of the process steps can take place at higher pressure than normal for reforming of natural gas by autothermal reforming (ATR), combined reforming forming (CR) or partial oxidation (POX). The fact that reforming and shift can take place at a higher pressure leads to a reduction in capital costs and in compression energy for $CO_2$ before deposition. It is also possible to separate out and compress $CO_2$ in liquid form which can give further savings. In the present invention the reforming and shift reactions can be carried out at lower temperatures than those beeing neccessary/required at a given pressure. Lower temperatures at a given pressure also lead to savings. Further it can be unneccessary with both low temperature shift and methanation of residual carbon monoxide, which is standard technology today in production of hydrogen for synthesis of ammonia. A method to separate $CO_2$ can be by an amine washing process, which in the present invention can be carried out by a simplified method by using pressure release instead of steam stripping.

The following chemical reactions take place by production of synthesis gas and hydrogen by reforming of natural gas:

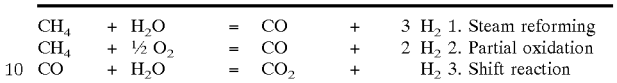

| | | | | | |
|---|---|---|---|---|---|
| $CH_4$ | + $H_2O$ | = CO | + | 3 $H_2$ | 1. Steam reforming |
| $CH_4$ | + ½ $O_2$ | = CO | + | 2 $H_2$ | 2. Partial oxidation |
| CO | + $H_2O$ | = $CO_2$ | + | $H_2$ | 3. Shift reaction |

The heat of reaction for the strongly endothermic steam reforming can be provided either by external heating, as in a steam reformer, or by combination with the partial oxidation in an autothermal reformer.

In steam reformer (SR) natural gas (methane) is converted in a tube reactor at high temperature and relatively low pressure. A steam reformer consists of many reactor tubes, i.e. 200–250 tubes with relative lengths of 12–13 meters, inside diameter of about 10 cm and an outside diameter of about 12 cm. This is a space demanding unit with a length of 30–50 meters, width of 10–12 meters and a height of 15–20 meters. Conventional steam reformers are operated in the pressure range from 15 to 30 bar The outlet temperature of the gas from a conventional steam reformer lies in the temperature area 950° C. The energy which is used to carry out the endothermic reactions is supplied by exsternal firing/heating (top-, side-, bottom- or terrace-fired). The ratio between steam and carbon is from 2.5 to 3.5, and the ratio between hydrogen and carbon monoxide in the product stream is from 2.7 to 3.0. A typical synthesis gas produced from a steam reformer contains approximately 3% by volume of methane.

In the present invention the reforming of natural gas (equation 1 and 2 above) can take place in an autothermal reformer (ATR). In an ATR natural gas (methane) is fed together with oxygen/air into a combustion chamber. The energy which is required to operate the endothermic steam reforming reactions is provided by the exothermic reactions between hydrocarbons/hydrogen and oxygen/air. The temperature i the combustion chamber can reach more than 2000° C. After the combustion chamber the reactions are driven to equilibrium over a catalyst bed before the synthesis gas is leavig the reactor at approximately 1000° C. The size of such a unit could be a height of 10–15 meters and a diameter of 5–6 meters. Typical ratio of steam:carbon is from 0.6 to 1.4. The ratio between hydrogen and carbon monoxide is lower than 2. Typical methane slip is 1–2% by volume i the product stream. The ATR can be operated at higher pressure than the SR.

The present invention can also take place in a partial oxidation reactor (POX) which also is an autothermal reformer except that the unit does not comprise a catalyst bed. This unit is often somewhat bigger if the same capacity compared to an ATR shall be maintained. The reason for a somewhat bigger reformer is that the ATR has catalyst which make the endothermic reactions more rapid. The exit temperature for a POX is also somewhat higher than for a typical ATR.

Reforming of natural gas can also be made by combined reforming (CR) which is a combination of a steam reforming (SR) and an autothermal reforming (ATR). A combination of SR and ATR makes it possible to adjust the composition out of the reformer unit by regulating the efforts on the two reformers. SR is in CR operated at <<milder>> conditions. i.e. lower outlet temperature, which leads to a high methane slip. The residual methane is reacted in the ATR. The ratio steam:carbon is in the area 1.8–2.4, with a ratio between hydrogen and carbon monoxide in the product gas higher than 2.

After reforming of the natural gas the gas mixture according to the present invention is shifted. The gas mixture from the reformer reactor contains mainly the gas components CO, $H_2$, $H_2O$, $CO_2$ and some $CH_4$. Between these components there is an equilibrium relation given by the stoichiometric equation:

$$CO+H_2O=CO_2+H_2$$

This reaction is called the water shift reaction, and by operating a shift reactor at certain conditions the equilibrium can be forced to the right and a gas mixture is obtained which is rich in hydrogen and carbon dioxide, and where the consentration of carbon monoxide is low. Sufficient reaction velocity is provided by use of suitable catalysts, and in processes where a high degree of reaction of CO is desirable (e.g. ammonia synthesis) two fixed bed reactors are used in series, high temperature shift reactor and low temperature shift reactor, respectively. Two steps are chosen because the equilibrium is favoured by low temperature, whereas the reaction velocity is favoured by high temperature. By selecting two reactors working in series, a smaller total reactor volume is achieved. The process is nearly pressure independent and normally the same pressure as in the reformer is used. Typical temperature out of the first reactor is 420° C. and out of the second reactor 230° C. Catalyst in the first step is normally based on chromium/iron, whereas the catalyst in the second step normally is a copper/zinc catalyst.

In the shift unit CO and $H_2O$ are reacted to $CO_2$ and $H_2$, and in known technique it is often a requirement that the mentioned reaction to a highest posssible degree is driven to the right, so that as little CO as posible is present in the gas mixture out of the shift unit. A low content of CO in the mentioned gas mixture again gives a high purity of the $H_2$-rich gas stream out of the separation unit. In known an the ratio $H_2O:CO$ is usually equal to 10:1, which gives a high consumption of $H_2O$, for thereafter to obtain a high purity of the $H_2$-rich gas. In the present invention it is, however, acceptable with more impurities in the $H_2$-rich gas, which implies a lower consumption of $H_2O$ and again a simpler shift process. These are factos which gives total cost savings by the production of a $CO_2$-rich and $H_2$-rich gas stream. In the present invention it is acceptable with a ratio $H_2O:CO$ of from 1 to 9, preferably from 1.5 to 4.

If the requirement to reaction of $CO_2$ is moderate, which will be the case if the gas mixture shall be burned for energy purposes, the shift reaction can be carried out in one step. A simple high pressure shift reactor can then be selected.

Gasses in mixture can be separated more or less completely based on the different properties of the gas molecules. The most common principles are absorption, adsorption, semipermeable membranes and kryogenic distillation.

$CO_2$ is an acid gas, and the most widely used method to separate the mentioned gas from other non-acid gas molecules is absorption. During absorption the different chemical properties of the gas molecules are utilized. By contacting the gas mixture with a basic liquid the acid gases will to a high degree be dissolved in the liquid. The liquid is separated from the gas and the absorbed gas can then be set free either by altering the composition of the liquid or by altering pressure and temperature. For separation of $CO_2$ mainly aqueous solutions of alcoholamines are used. The absorption is taking place at a relatively low temperature and a high pressure, while stripping of the gas from the liquid is carried out at a relatively high temperature and low pressure. To liberate $CO_2$ from the amine phase in the stripping unit, stripping steam is usually used. If the partial pressure of $CO_2$ in the gas into the absorber is high, e.g. higher than 15 bar, it is possible to obtain high concentrations in the amine phase, and a large part of absorbed $CO_2$ can be set free in the stripping unit at elevated pressure, e.g. 5–8 bar.

By the use of one or more semipermeable membrane units it is possible to achieve that molecules of different molecular weight and different properties permeate the membrane at different velocities. This principle can be utilized to separate gases. For the gas mixture in question membranes can be selected where $H_2$ permeates rapidly, whereas $CO_2$ permeates slowly, whereafter a separation-in-part of the different gas components is achieved. By combining solid membranes and liquid membranes it is also possible to achieve a rapid permeation of $CO_2$, while $H_2$ is kept back. It can be difficult to achieve complete separation of the different gas components by using different separation methods. This is especially the case by the use of membranes. For gas mixtures which are to be burned, a partly separation of hydrogen and $CO_2$ will be sufficient.

In a gas power plant normally natural gas is burned wherein the main component is methane, and air in a combustion chamber at elevated pressure. The combustion gases are driving the turbines which provide necessary shaft moment to the compressor part (which compresses air to the pressure of the combustion chamber) and to operate the generator or other mechanical equipment. Mixing in of natural gas takes place in burners and design/construction of these is important in order to obtain correct flame temperature and to prevent formation of undesired combustion products. If a hydrogen rich gass is used instead of a natural gas, more conditions which are necessary for the construction of burners, combustion chamber and turbine, will be changed. The most important are combustion energy, flame propagation velocity, explosion range and auto ignition temperature. These are conditions which lead to the fact that a hydrogen rich gas cannot be used in a gas turbine which is constructed for combustion of metahne without modifications. The eperience in burning hydrogen rich gases is limited, and the technology is available to a delimited extent.

In the present invention it is desireable to deposit out-separated $CO_2$. Large amounts of $CO_2$ can be deposited according to various methods, of which the three most interesting are deposition at very deep oceans, deposition in deep water reservoirs and deposition in oil reservoirs wherin the gas at the same time functions as drive agent for enhanced oil recovery. The two last mentioned storage methods are operated commercially. In these storage forms the $CO_2$ gas has to be brought to high pressure for transport in pipelines to a deposition well and further to injection. The injection pressure will vary, but could be in the range 50 to 300 bar. If the $CO_2$ gas can be separated from the $H_2/CO_2$ mixture at an elevated pressure, significant compression work can be avoided, and this is the case in the present invention.

The attached figures show known technique and different embodiments of the present invention.

FIG. 1 shows known technique in the form of steam reforming with hydrogen firing.

FIG. 2 shows POX or ATR with oxygen where natural gas (1) is pre-treated before this (2) and is passed into an ATR or a POX where water (3) and oxygen gas (4) are added. The reformed gas mixture (5) is thereafter passed to a shift reactor/shift unit whereafter the gas mixture (6) is passed to a separation unit where a $H_2$-rich gas (10) and a $CO_2$-rich gas (7) are provided. Stream (7) can possibly be compressed further before deposition/reinjection. Stream (10) can be utilized i.a. a hydrogen power plant.

FIG. 3 shows POX or ATR with air. This is in principle the same process as described in FIG. 2, but in this case air is used as oxidant in the reformer instead of oxygen. This gives somewhat milder conditions than those present by the use of oxygen i the burner. By the use of air relatively big amounts of nitrogen gets into the system and the partial pressure of $CO_2$ will be considerably lower. This again will render it more difficult to take out $CO_2$ at an elevated pressure in the separation process. The ratio between $H_2$ and $N_2$ will be approximately 1:1.

EXAMPLE 1

The ATR reactor can be operated under different operating conditions. In the tables below the composition of the gas at the outlet of the reactor is shown for different pressures, temperatures and steam/carbon ratios. In all calculations the ratio oxygen/carbon is set at 0.6. Feed gas has the composition $CO_2$=2.5; $CH_4$=82; $C_2$=9; $C_3$=5: $C_3$=1.5.

TABLE 1 shows composition in mole % in dry gas at a pressure of 80 bar

| | Steam/carbon | | | | | | | | |
|---|---|---|---|---|---|---|---|---|---|
| | S/C = 0.5 | | | S/C = 1.8 | | | S/C = 2.8 | | |
| | Temp. ° C. | | | | | | | | |
| | 800 | 1000 | 1200 | 800 | 1000 | 1200 | 800 | 1000 | 1200 |
| $H_2$ | 40.9 | 59 | 65 | 52.9 | 65.6 | 66.8 | 58.8 | 67.9 | 69.2 |
| CO | 13.4 | 25.9 | 36.3 | 10.7 | 20.8 | 27.1 | 9.4 | 17.7 | 23.2 |
| $CO_2$ | 17.4 | 7.3 | 3.8 | 19 | 10.9 | 6.1 | 19.7 | 13.1 | 7.6 |
| $C_1$ | 28.2 | 7.8 | 1.0 | 17.5 | 2.7 | 0 | 12.1 | 1.3 | 0 |

TABLE 2 shows composition in mole % in dry gas at a pressure of 120 bar

| | Steam/carbon | | | | | | | | |
|---|---|---|---|---|---|---|---|---|---|
| | S/C = 0.5 | | | S/C = 1.8 | | | S/C = 2.8 | | |
| | Temp. ° C. | | | | | | | | |
| | 800 | 1000 | 1200 | 800 | 1000 | 1200 | 800 | 1000 | 1200 |
| $H_2$ | 36.6 | 55.7 | 64 | 48.8 | 63.8 | 67.0 | 56 | — | 69.2 |
| CO | 11.7 | — | 30 | 9.4 | 19.9 | 24.6 | 7.8 | 19.4 | 23 |
| $CO_2$ | 19.4 | 6.4 | 4 | 20.1 | 11.6 | 8.0 | — | 9.6 | 7.8 |
| $C_1$ | 32.8 | 11.2 | 1.9 | 21.6 | 4.7 | 0.4 | 18.4 | 0 | 0 |

EXAMPLE 2

Example 2 comprises a one step shift reactor. The gas mixture into the shift reactor can have a variyng composition as is evident from the Tables 1 and 2. If the gas composition in Table 1 is used at 1000° C. and S/C of 1.8, this will correspond to a steam/CO ratio out of the ATR reactor of about 3.0. Table 3 below shows a possible composition of feed gas and outcoming gas from a one step shift reactor having an outlet temperature of 400° C.

TABLE 3 shows the gas composition form an one step shift reactor given in moles/100 moles dry gas.

| Component | Feed gas | Leaving gas |
|---|---|---|
| $H_2$ | 65.6 | 70.8 |
| CO | 20.8 | 2.4 |
| $CO_2$ | 10.9 | 24.5 |
| Cl | 2.7 | 2.3 |
| $H_2O$ | 62.4 | 37.3 |

EXAMPLE 3

The example comprises a two step shift reactor. If a two step shift reactor is used, higher degree reaction of CO will be obtained. Table 4 shows a possible gas composition for a two step process where the outlet temperature in the first reactor is 400° C. and in the second reactor 250° C. Inflowing gas has the same composition as in example 2.

TABLE 4

Possible gas composition for a two step process given in moles/100 moles dry gas.

| Component | Feed gas | Leaving gas |
|---|---|---|
| $H_2$ | 65.6 | 71.5 |
| CO | 20.8 | 0.3 |
| $CO_2$ | 10.9 | 26.0 |
| $C_1$ | 2.7 | 2.2 |
| $H_2O$ | 62.4 | 35 |

EXAMPLE 4

Separation of $CO_2$ by absorption i etanolamine solution (amine washing) is described in this example. The gas mixture out from the shift reactor contains significant amounts of steam. After cooling to e.g. 40° C. most of the steam will be condensed out, and below two types of possible gas mixtures from the reforming process are shown:

TABLE 5

Possible gas compositions from the reforming process

| Component | Gas 1 | Gas 2 |
|---|---|---|
| $CH_4$ | 3 mol % | 3 mol % |
| CO | 2 mol % | 2 mol % |
| $CO_2$ | 17.7 mol % | 29 mol % |
| $H_2$ | 62.3 mol % | 66 mol % |
| Total pressure | 40 bar | 80 bar |

These gas mixtures can be fed to an absorption column where an aqueous methanolamine solution is used as absorption liquid. The amine solution will absorb the main part of $CO_2$, and the gas out of the absorption column will mainly consist of hydrogen. The $CO_2$ rich amine solution is fed to a stripping unit where the pressure is e.g. 8 bar and the temperature is e.g. 120° C. A part of the $CO_2$ gas will be liberated because of the temperature increase and the pressure reduction. Further $CO_2$ can be set free from the amine solution by stripping with steam.

Table 6 below shows a possible composition of the gas phase out from the absorption column and out fram the stripping unit when gas of type 2 in Table 5 is used as feed and only pressure reduction and temperature increase is used and no stripping steam.

TABLE 6 shows the composition of gas from absober unit and stripping unit without use of stripping steam.

| Component | Out from absorption column | Out from stripping column |
|---|---|---|
| $CH_4$ | 4 mol % | — |
| CO | 3 mol % | — |
| $H_2O$ | — | 30 mol % |
| $CO_2$ | 3 mol % | 70 mol % |
| $H_2$ | 90 mol % | — |
| Total pressure | 80 bar | 8 bar |
| Temperature | 50° C. | 120° C. |

EXAMPLE 5

Example 5 concerns separation by condensation. By cooling of a $CO_2$-rich gas $CO_2$ could be condensed out as a liquid or precipitated as a solid ($CO_2$ ice). At a temperature of −57° C. the freezing point of $CO_2$ is reached and the vapour pressure of $CO_2$ is then 5.1 bar. If $CO_2$ gas is further cooled, solid $CO_2$ is obtained and at −78° C. the vapour pressure over solid $CO_2$ is 1 bar.

Gas of type 2 in Table 5 is dried completely free of water before it is treated in a condenser unit consisting of more cooing steps, wherein the temperature of the gas in the first cooling step is reduced to about−55° C. At this temperature a big part of the $CO_2$ will condense out and the gas composition out from the condenser can be as shown in column 2 in the table below:

TABLE 7 shows the composition of gas phases i a two step cooling process

| Component | Composition of gas | |
|---|---|---|
| Composition of gas | From cooling step 1 | From cooling step 2 |
| $CH_4$ | 3.5 mol % | 3.8 mol % |
| CO | 2.3 mol % | 2.5 mol % |
| $N_2$ | 0.2 mol % | 0.2 mol % |
| $CO_2$ | 7.5 mol % | 1.0 mol % |
| $H_2$ | 86.7 mol % | 92.5 mol % |
| Total pressure | 80 bar | 80 bar |

In this example about 70% av $CO_2$ in the incoming gas will be condensed out in cooling step 1. By lowering the temperature further in a new process unit (cooling step 2) to e.g.−80° C. the gas composition could be as shown in column 3 in Table 7 above. By means of the two cooling steps 96% of $CO_2$ in the incoming gas can be removed. The out-condensed liquid and the precipitated solid will be nearly pure $CO_2$.

EXAMPLE 6

This example describes compression of $CO_2$. The gas phase from the stripping unit in example 4 contains steam and $CO_2$. By cooling of this gas to e.g. 40° C., most of the water vapour will be condensed out and the nearly pure gas at a pressure of 8 bar can be compressed to a desired shipment pressure for transport of $CO_2$ in pipeline.

EXAMPLE 7

The example concerns one or more membrane units where the $CO_2$-rich gas can have a pressure approximately equal to the partial pressure of $CO_2$ into the separation unit, as shown in Table 1 below.

| Total inlet pressure on the separation unit (bar) | Partial pressure of $CO_2$ out from the separation unit (bar) |
|---|---|
| 200 | 40 |
| 250 | 50 |
| 300 | 60 |

We claim:
1. Method for production of a $CO_2$-rich gas stream and a $H_2$-rich gas stream, characterized in that the method comprises the following steps:
   a) natural gas and water are fed to a reforming reactor and converted to synthesis gas under supply of an $O_2$-rich gas to the reactor;
   b) the gas stream from a) is shifted, in one step, whereby the content of CO is reduced and the amounts of $CO_2$ and $H_2$ are increased by reaction of $H_2O$ at a ratio $H_2O:CO$ of from 1 to 9;
   c) the gas stream from b) is separated in a separation unit into a $CO_2$-rich and a $H_2$-rich gas stream, respectively, wherein the pressure in the $CO_2$-rich gas stream after the separation is from 5 to 100 bar.

2. Method according to claim 1, characterized in that the ratio $H_2O:CO$ in the shift process is from 1.5 to 4.

3. Method according to claim 1, characterized in that the pressure in the $CO_2$-rich gas stream after the separation unit is from 5 to 50 bar.

4. Method according to claim 1, characterized in that the carbon part in the $H_2$-rich gas stream is from 1 to 20% by volume.

5. Method according to claim 1, characterized in that the carbon part in the $H_2$-rich gas stream is from 5 to 15% by volume.

6. Method according to claim 1, characterized in that the natural gas in step a) is supplied with air/oxygen enriched air.

7. Method according to claim 1, characterized in that the reformer reactor is a partial oxidation reactor.

8. Method according to claim 1, characterized in that the reformer reactor is an autothermal reformer.

9. Method according to claim 8, characterized in that the gas stream from a combustion chamber in an autothermal reformer is contacted with a catalyst bed.

10. Method according to claim 7, characterized in that the reforming is carried out without a catalyst.

11. Method according to claim 1, characterized in that the gas stream out of the reformer has a temperature within the interval from 800 to 1200° C.

12. Method according to claim 6, characterized in that the $CO_2$-rich gas stream includes at least part of $N_2$.

13. Method according to claim 1 wherein the produced $CO_2$-rich gas stream is applied for injection into marine formations.

14. Method according to claim 1 wherein the produced $H_2$-rich gas stream is applied for hydrogenation.

15. Method according to claim 1 wherein the produced $H_2$-rich gas stream is applied as a source of energy/fuel in fuel cells.

16. Method according to claim 1 wherein the produced $H_2$-rich gas stream is applied for the production of electricity.

* * * * *